United States Patent
Collins et al.

(10) Patent No.: US 10,920,675 B2
(45) Date of Patent: Feb. 16, 2021

(54) METHODS AND SYSTEMS FOR DETECTION OF CONTROL SENSOR OVERRIDE

(71) Applicant: General Electric Company, Schenectady, NY (US)

(72) Inventors: Timothy Robert Collins, Greer, SC (US); Bryan Edward Sweet, Valatie, NY (US)

(73) Assignee: General Electric Company, Schenectady, NY (US)

( * ) Notice: Subject to any disclaimer, the term of this patent is extended or adjusted under 35 U.S.C. 154(b) by 716 days.

(21) Appl. No.: 15/333,566

(22) Filed: Oct. 25, 2016

(65) Prior Publication Data
US 2018/0112602 A1    Apr. 26, 2018

(51) Int. Cl.
*F02C 9/28* (2006.01)
*F02C 9/00* (2006.01)
*F02C 9/46* (2006.01)

(52) U.S. Cl.
CPC .............. *F02C 9/28* (2013.01); *F02C 9/00* (2013.01); *F02C 9/46* (2013.01); *F05D 2260/80* (2013.01); *F05D 2270/303* (2013.01)

(58) Field of Classification Search
CPC .......... F01D 21/003; F01D 21/12; F02C 9/00; F02C 9/28; F02C 9/46; F05D 2260/80; F05D 2260/873; F05D 2270/303; G01M 15/00; G01M 15/048; G01M 15/14

USPC ........ 73/204.19, 112.01; 374/141, 153, 144, 374/110, 166, 112, 1, 163
See application file for complete search history.

(56) References Cited

U.S. PATENT DOCUMENTS

| | | | |
|---|---|---|---|
| 6,853,959 B2 * | 2/2005 | Ikeda | G05B 23/0264 702/188 |
| 6,962,043 B2 | 11/2005 | Venkateswaran et al. | |
| 7,140,186 B2 | 11/2006 | Venkateswaran et al. | |
| 7,702,435 B2 | 4/2010 | Pereira et al. | |
| 7,734,443 B2 | 6/2010 | De et al. | |
| 9,790,834 B2 * | 10/2017 | Miller | F01N 11/002 |
| 2002/0150142 A1 | 10/2002 | Sanderson | |
| 2002/0183916 A1 | 12/2002 | Cleary | |

* cited by examiner

Primary Examiner — Jason H Duger
(74) Attorney, Agent, or Firm — Armstrong Teasdale LLP

(57) ABSTRACT

A gas turbine engine system for detecting control sensor override includes a plurality of temperature sensors coupled to the gas turbine engine system. The temperature sensors are configured to generate a plurality of signals representative of exhaust gas temperatures of the gas turbine engine. The system includes an on-site monitoring system coupled in communication to the plurality of temperature sensors. The on-site monitoring system has a processor programmed to continuously receive the plurality of signals from the temperature sensors. In addition, the processor is programmed to analyze the plurality of signals to verify the accuracy of the exhaust gas temperatures associated with the plurality of signals, and to detect a jumpered temperature sensor of the plurality of temperature sensors.

6 Claims, 8 Drawing Sheets

METHODS AND SYSTEMS FOR DETECTION OF CONTROL SENSOR OVERRIDE

BACKGROUND

The field of the present disclosure relates generally to monitoring turbine engines and more specifically, to methods and systems for detecting control sensor override in turbine engines.

At least some known gas turbines typically include a compressor for compressing air and a combustor where the compressed air and fuel are mixed and burned. The hot exhaust gases exiting the combustor drive a turbine of the gas turbine to generate power. Typically, performance and safety monitoring may be done through daily checks and measurements and periodic tests of the gas turbines. The results are used for maintenance and repair diagnostic processes. For example, after a fault occurs, previously recorded data of the gas turbine is analyzed to facilitate identifying a cause of failure, and maintenance of the gas turbine, as required, is performed to recover from the identified failure. However, due to time delays associated with analyzing faults, determining failure causes, and performing corrective actions, use of present methods often results in undesirable lengths of shutdown and repair time for such gas turbines and their components.

In known gas turbines, exhaust temperature monitoring is desirable because increased temperatures can cause damage to, for example, combustor elements, hot gas path components, and turbine blades. Increased exhaust gas temperatures may also cause emission levels of certain regulated compounds, such as nitrogen oxides, to rise above allowable limits. In addition, decreased temperatures can indicate an anomaly and/or component failure in the gas turbine, such as a combustor flame out. In such gas turbines, temperature sensors, such as, for example, thermocouples, are used to determine the temperature of exhaust gases expelled from the gas turbine combustor. Failed temperature sensors, however, can cause the gas turbine control system to indicate a fault, requiring, for example, shutdown and repair, and/or reduced operating loads of the gas turbine. As such, in at least some known gas turbines, operators may provide the gas turbine control system false data for a failed temperature sensor, thereby overriding the performance and safety monitoring system. For example, a failed temperature sensor may be bypassed by providing a signal to the control system at the failed temperature input from a properly functioning temperature sensor, which is similarly monitoring exhaust temperature but at a different location. As such, the gas turbine may continue to be operated in a less than optimal condition.

Accordingly, it would be desirable to implement a remote controls override detection system that uses existing temperature sensors on the gas turbine to determine when failed temperature sensors are bypassed by an operator. Advantages of such a system include enabling safety monitoring of a gas turbine and/or a fleet of gas turbines engines to be implemented with reduced cost, and enabling rapid identification of gas turbines running in a potentially unsafe condition.

BRIEF DESCRIPTION

In one aspect, a gas turbine engine system for detecting control sensor override is provided. The system includes a plurality of temperature sensors coupled to the gas turbine engine and configured to generate a plurality of signals representative of exhaust gas temperatures. The system also includes an on-site monitoring system coupled in communication to the plurality of temperature sensors. The on-site monitoring system includes a processor programmed to continuously receive the plurality of signals, analyze the plurality of signals to verify the accuracy of the exhaust gas temperatures associated with the plurality of signals, and detect a jumpered temperature sensor of the plurality of temperature sensors.

In another aspect, a system for remote detection of control sensor override in a fleet of gas turbine engines is provided. The system includes an on-site monitoring system coupled to each gas turbine engine of the fleet of gas turbine engines. The on-site monitoring system is configured to continuously receive a plurality of signals representative of exhaust gas temperatures. The on-site monitoring system is further configured to transmit the plurality of signals to a remote monitoring system. The system also includes a plurality of temperature sensors coupled to each gas turbine engine and configured to transmit the plurality of signals to the on-site monitoring system. Moreover, the system includes a remote monitoring system remote from each gas turbine engine. The remote monitoring system is configured to receive the plurality of signals from the on-site monitoring system and to detect a jumpered temperature sensor in each gas turbine engine based on the plurality of signals.

In yet another aspect, a method for detecting control sensor override in a gas turbine engine is provided. The method includes transmitting a plurality of temperature signals to a monitoring system. The method also includes designating the plurality of temperature signals into unique signal pairs. Furthermore, the method includes determining a plurality of temperature difference values with respect to time for each of the designated signal pairs. Moreover, the method includes determining a mean value of the plurality of temperature difference values for each of the designated signal pairs, and determining a standard deviation value of the plurality of temperature difference values for each of the designated signal pairs. Furthermore, the method includes detecting a jumpered signal pair of the designated signal pairs based on the respective mean and standard deviation values of the jumpered signal pair.

DRAWINGS

These and other features, aspects, and advantages of the present disclosure will become better understood when the following detailed description is read with reference to the accompanying drawings in which like characters represent like parts throughout the drawings, wherein.

Figure 1:
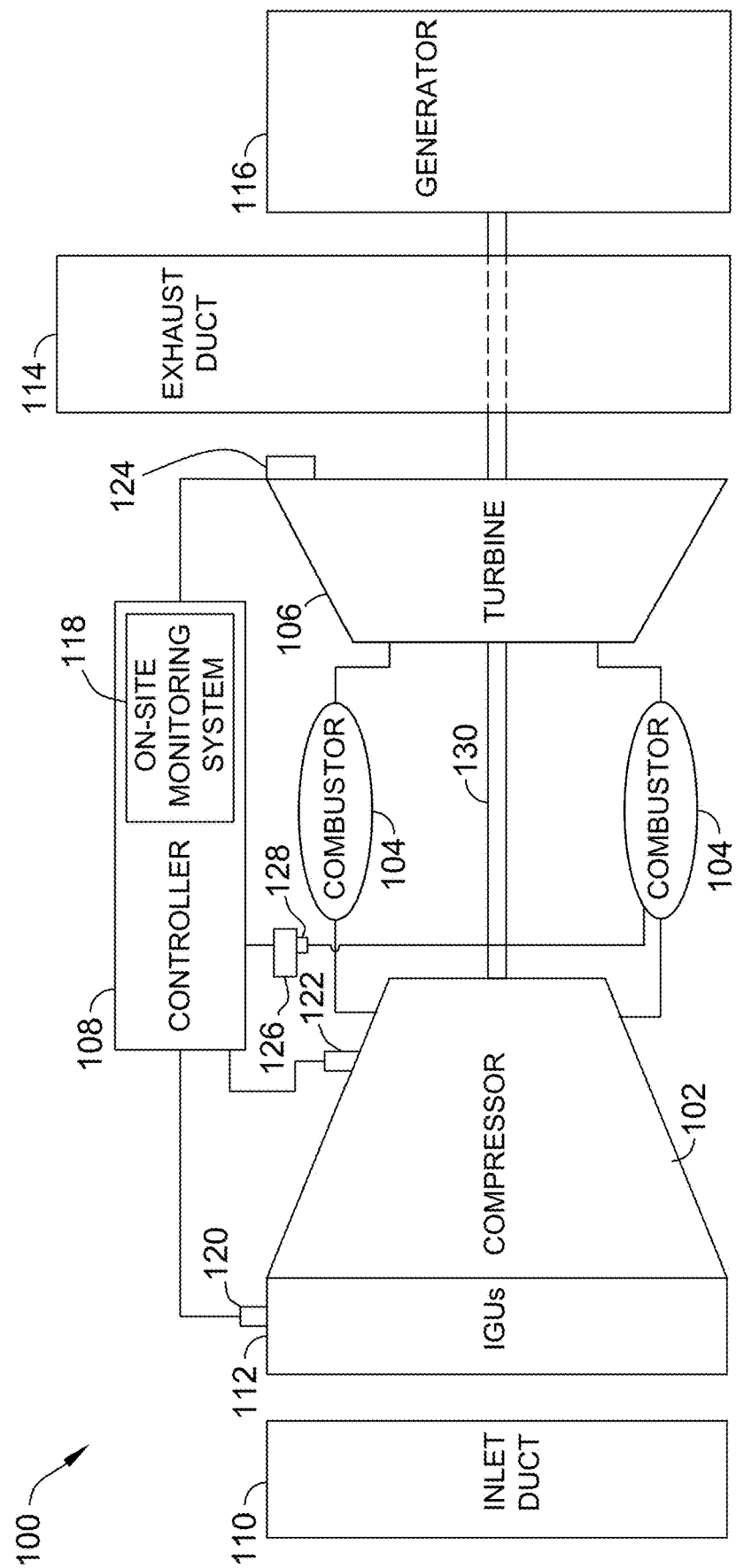
FIG. 1 is a schematic view of an exemplary gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not. Furthermore, references to "one embodiment" are not intended to be interpreted as excluding the existence of additional embodiments that also incorporate the recited features. Moreover, unless explicitly stated to the contrary, embodiments "including" or "having" an element or a plurality of elements having a particular property may include additional such elements not having that property.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "computer" and related terms, such as, "computing device", are not limited to integrated circuits referred to in the art as a computer, but rather broadly refers to a microcontroller, a microcomputer, a programmable logic controller (PLC), an application specific integrated circuit, and other programmable circuits, and these terms are used interchangeably herein.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the terms "processor" and "computer" and related terms, e.g., "processing device," "computing device," and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

FIG. 1 is a schematic view of an exemplary gas turbine engine system 100. While FIG. 1 illustrates an exemplary gas turbine engine, it should be noted that the methods and systems for detecting exhaust temperature sensor override described herein are not limited to any particular type of turbine engine. One of ordinary skill in the art should appreciate that the methods and systems for detecting exhaust temperature sensor override described herein may be used with any rotary machine, in any suitable configuration that enables such a system and method to function as further described herein.

In the exemplary embodiment, gas turbine engine 100 includes a compressor 102, a plurality of combustors 104, a turbine 106 drivingly coupled to compressor 102 via a rotor shaft 130, a computer control system, or controller 108, and an on-site monitoring system 118. An inlet duct 110 coupled to compressor 102 channels ambient air and, in some instances, injected water to compressor 102. Duct 110 includes ducts, filters, screens, or sound absorbing devices that facilitate filter and/or channeling ambient air flowing through inlet duct 110 and into inlet guide vanes (IGVs) 112 of compressor 102. Combustion gasses from gas turbine engine 100 are directed through exhaust duct 114. Exhaust duct 114 includes sound adsorbing materials and emission control devices (not shown). Gas turbine engine 100 drives a generator 116 that produces electrical power. In the exemplary embodiment, generator 116 is a hot end drive generator. Alternatively, generator 116 is coupled to rotor shaft 130 at an opposite end of gas turbine engine 100.

In the exemplary embodiment, a plurality of sensors 120, 122, and 124 detect various operating conditions of gas turbine engine 100 and/or the ambient environment during operation of gas turbine engine 100. For example, and without limitation, sensors 120, 122, and 124 continuously monitor mechanical and/or thermodynamic parameters of gas turbine engine 100. In the exemplary embodiment, a plurality of turbine exhaust temperature sensors 124 is located in turbine 106. Furthermore, for example, and without limitation, at least one pressure sensor 120 is located in the inlet of gas turbine engine 100 and at least one compressor discharge pressure sensor 122 is located at the outlet of compressor 102 of gas turbine engine 100. For clarity, only one of sensors 120, 122, and 124 are illustrated, however, those skilled in the art will recognize that more than one sensor can be used, i.e., that multiple redundant sensors 120, 122, and 124 can be used to measure the same operating condition, respectively. Sensors 120, 122, and 124 include for example, and without limitation, pressure sensors, temperature sensors, flame detector sensors, and/or any other sensor device that senses various operating parameters during operation of gas turbine engine 100.

As used herein, the term "parameter" refers to characteristics that can be used to define the operating conditions of gas turbine engine 100, such as temperatures, pressures, and/or gas flows at defined locations within gas turbine engine 100. Some parameters are measured, i.e., are sensed and are directly known, while other parameters are calculated by a model and are thus estimated and indirectly known. Some parameters are initially input by a user to controller 108. The measured, estimated, or user input parameters represent a given operating state of gas turbine engine 100.

In the exemplary embodiment, a fuel control system 126 regulates an amount of fuel flow from a fuel supply (not shown) to the plurality of combustors 104, an amount split between primary and secondary fuel nozzles (not shown), and an amount mixed with secondary air flowing into the plurality of combustors 104. Fuel control system 126 may also select a type of fuel for use in the plurality of combustors 104. Fuel control system 126 may be a separate unit or may be a component of controller 108.

Controller 108 is a computer system that includes at least one processor (not shown) and at least one memory device (not shown) that executes operations to control the operation of gas turbine engine 100 based at least partially on control sensors 120, 122, and 124 input signals and on instructions from human operators. The controller includes, for example, a model of gas turbine engine 100. Operations executed by controller 108 include sensing or modeling operating parameters, modeling operational boundaries, applying operational boundary models, or applying scheduling algorithms that control operation of gas turbine engine 100, such as by regulating a fuel flow to the plurality of combustors 104. Controller 108 compares operating parameters of gas turbine engine 100 to operational boundary models, or scheduling algorithms used by gas turbine engine 100 to generate control outputs, such as, without limitation, a firing temperature. Commands generated by controller 108 may cause a fuel actuator 128 on gas turbine engine 100 to selectively regulate fuel flow, fuel splits, and/or a type of fuel channeled between the fuel supply and the plurality of combustors 104 based on the operating parameters, such as exhaust gas temperatures measured by the plurality of temperature sensors 124.

In the exemplary embodiment, on-site monitoring system 118 is coupled in communication with controller 108 and is configured to continuously receive data communicated from controller 108 and/or the plurality of temperature sensors 124. Further, in an alternative embodiment, on-site monitoring system 118 is configured to transmit data received from controller 108 to a remote monitoring system 230 (shown in FIG. 2) at substantially the same interval as which it receives data from controller 108. In the exemplary embodiment, on-site monitoring system 118 is configured as a component of controller 108. Alternatively, on-site monitoring system 118 is a separate component coupled in communication to controller 108 via one or more communication systems, as described herein.

Figure 2:
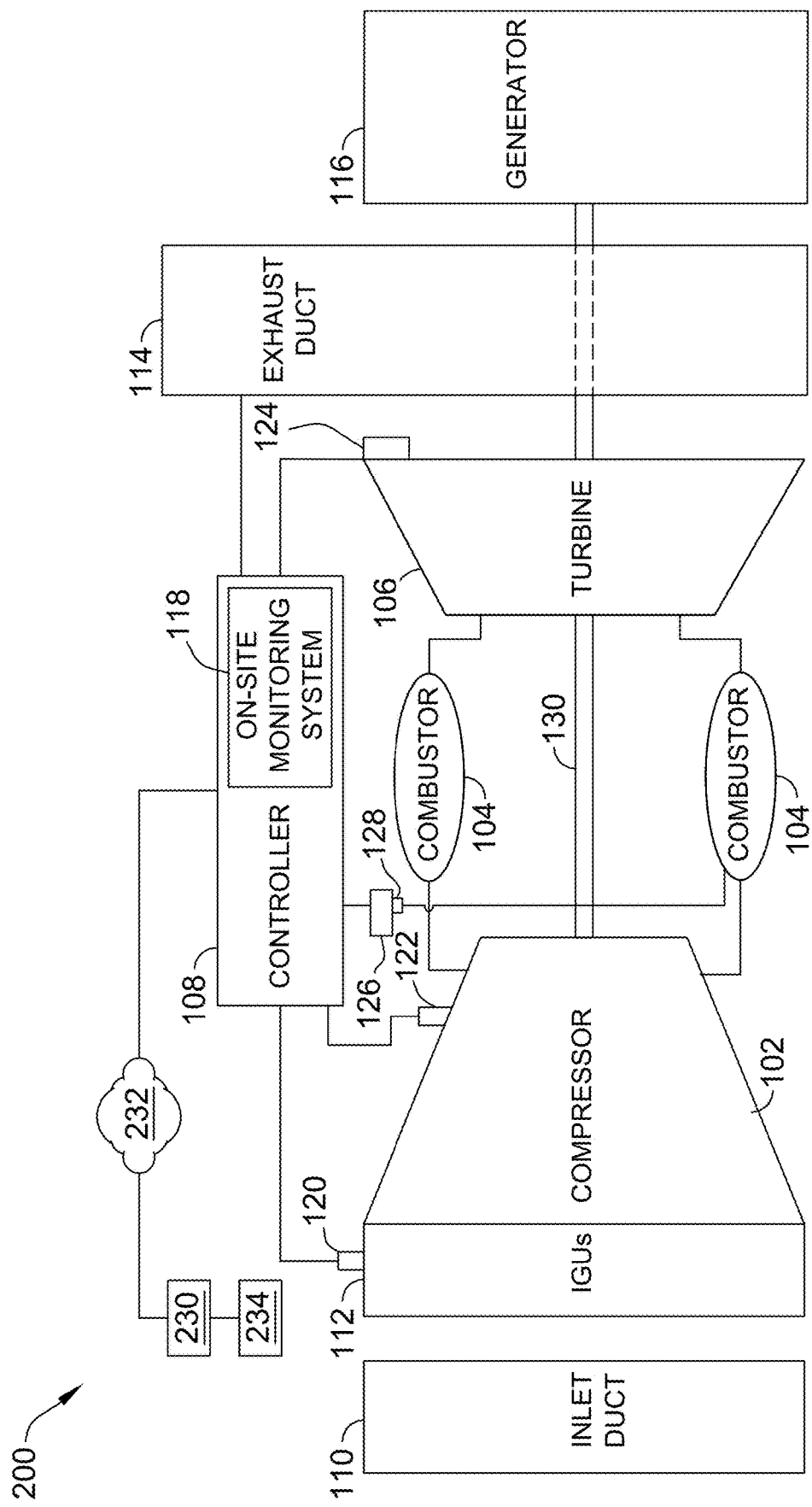
FIG. 2 is a schematic view of an alternative exemplary gas turbine engine, including a remote monitoring system.

FIG. 2 is a schematic view of an alternative exemplary gas turbine engine system 200, including a remote monitoring system 230. In the alternative embodiment, remote monitoring system 230 is coupled in communication with controller 108 via a communications network 232, for example, without limitation, a wired connection or a wireless connection. More specifically, controller 108 includes on-site monitoring system 118, and remote monitoring system 230 is coupled in communication with on-site monitoring system 118. In the exemplary embodiment, communications network 232 includes the Internet or any other network capable of communicating data between devices. For example, and without limitation, suitable networks may include or interface with any one or more of a local intranet, a local area network (LAN), a wide area network (WAN), a virtual private network (VPN), a digital T1, T3, E1 or E3 line, a digital subscriber line (DSL) connection, an Ethernet connection, an integrated services digital network (ISDN) line, or the like. Furthermore, communications network 232 may include communication links to any of a variety of wireless networks, including wireless application protocol (WAP), general packet radio service (GPRS), global system for mobile communication (GSM), code division multiple access (CDMA) or time division multiple access (TDMA), cellular phone networks, global positioning system (GPS), Bluetooth radio, or the like. Communications network 232 can further include or interface with any one or more of the following: RS-232 serial connection, IEEE-1394 (Firewire) connection, Fiber Channel connection, IrDA (infrared) port, SCSI (Small Computer Systems Interface) connection, USB (Universal Serial Bus) connection, or other wired or wireless, digital or analog interface or connection.

Referring back to FIG. 1, in the exemplary embodiment, controller 108 receives a plurality of operating parameters from the plurality of temperature sensors 124 indicative of exhaust gas temperature measurements of gas turbine engine 100 and transmits them to on-site monitoring system 118. Controller 108 is configured to generate at least one actual swirl value and at least one predicted swirl value, and compare the values to determine whether an anomaly occurs during the operation of gas turbine engine 100. If an anomaly is determined to occur, on-site monitoring system 118 is configured to generate at least one escalation alarm signal. The escalation alarm signal indicates, for example, and without limitation, a failed combustor 104 (e.g., a flameout of the combustor) and/or a failed temperature sensor 124. Controller 108 generates an escalation alarm and shuts down gas turbine engine 100 and/or defaults to a reduced operating load in the presence of the escalation alarm signal. If an operator determines that the escalation alarm signal is generated as a result of a failed temperature sensor 124, the operator may override on-site monitoring system 118 by providing controller 108 with a signal from a functioning temperature sensor 124, for example, and without limitation, by connecting or jumpering the failed temperature sensor 124 connector to a functioning temperature sensor 124, thereby facilitating providing a temperature signal to controller 108 and on-site monitoring system 118, appearing as if it originated from the failed temperature sensor 124.

Figure 3:
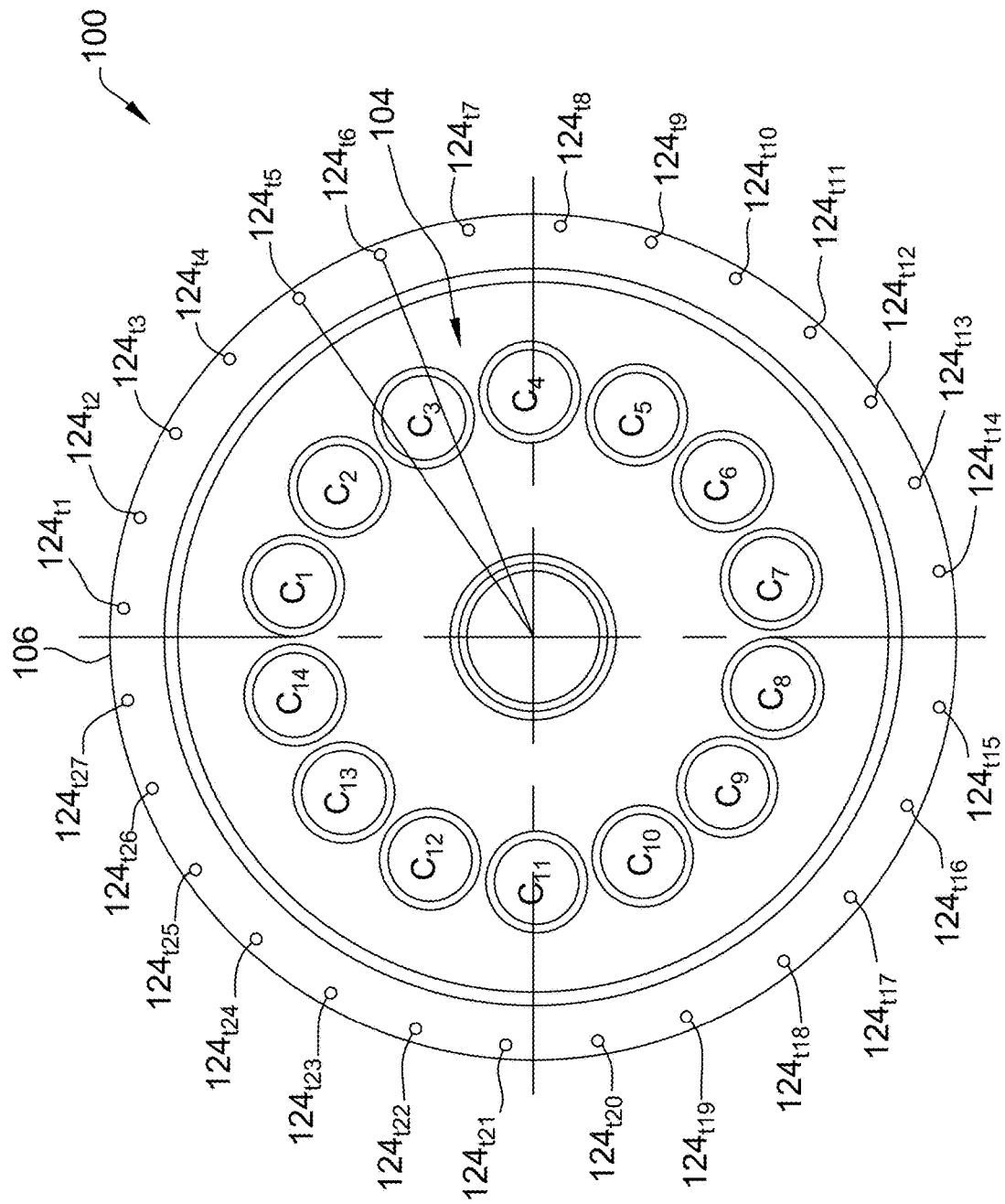
FIG. 3 is a schematic section of the gas turbine engine of FIG. 1, showing a combustor/temperature sensor arrangement.

FIG. 3 is a schematic section of gas turbine engine 100, which is substantially identical to gas turbine engine 200, showing a typical combustor 104/temperature sensor 124 arrangement. In the exemplary embodiment, each combustor of the plurality of combustors 104 is individually indicated by reference characters $C_1$-$C_{14}$, and is arranged in a circular pattern. While gas turbine engine 100 is shown having fourteen combustors 104, it is contemplated that gas turbine engine 100 can have any number of combustors 104 that enable gas turbine engine 100 to function as described herein. In addition, in the exemplary embodiment, the plurality of temperature sensors 124 are individually indicated by reference characters $124t_1$-$124t_{27}$, and are arranged radially around combustors $C_1$-$C_{14}$. While gas turbine engine 100 is shown having twenty-seven temperature sensors 124, it is contemplated that gas turbine engine 100 can have any number of temperature sensors 124 that enable gas turbine engine 100 to function as described herein.

In the exemplary embodiment, during operation, the plurality of combustors $C_1$-$C_{14}$ each produce high temperature exhaust gases that are channeled to turbine 106, where they are expanded to produce work. As the exhaust gasses flow through turbine 106, there is little mixing of the exhaust gasses from one combustor $C_1$-$C_{14}$ with the exhaust gasses of an adjacent combustor $C_1$-$C_{14}$. The exhaust gasses channeled from the plurality of combustors $C_1$-$C_{14}$, however, do not flow in a straight path through turbine 106, due in part to the turbine buckets (not shown) rotating past each combustor $C_1$-$C_{14}$. Rather, the exhaust gasses "swirl" as they flow through turbine 106. Each combustor of the plurality of combustors $C_1$-$C_{14}$ receives, for example, similar amounts of fuel from fuel control system 126 and air from compressor 102 (shown in FIG. 1), which facilitates relatively uniform exhaust gas temperatures from each of the plurality of combustors $C_1$-$C_{14}$. However, differences in the component systems (not shown) for each combustor $C_1$-$C_{14}$, results in slightly different exhaust gas temperatures. Additionally, in some instances, mechanical issues with combustor components can result in unequal fuel and/or air flows into the individual combustors $C_1$-$C_{14}$. As the exhaust gasses flow through turbine 106, temperature sensors $124t_1$-$124t_{27}$ measure the exhaust gas temperature proximate the respective sensor. The measured exhaust gas temperatures vary from sensor to sensor due to differences in the amounts of fuel and air supplied to respective combustors $C_1$-$C_{14}$. In addition, as the operating load level of gas turbine engine 100 changes, the swirl angle through gas turbine engine 100 changes. As the swirl angle changes, temperature sensors $124t_1$-$124t_{27}$ are exposed to different portions of the exhaust gas flow, thereby generating changing temperature measurements of each one of temperature sensors $124t_1$-$124t_{27}$.

In addition, in the exemplary embodiment, temperature sensors $124t_1$-$124t_{27}$ are aligned radially with differing portions of a respective combustor $C_1$-$C_{14}$. For example, as shown in FIG. 3, temperature sensor $124_{t5}$ is aligned with an outer portion of combustor $C_3$, as shown in FIG. 3. Temperature sensor $124_{t6}$ is aligned with the opposite outer portion of combustor $C_3$, but over a larger area of combustor $C_3$. The temperature distribution across a respective combustor $C_1$-$C_{14}$ is generally non-uniform, such that the center portion of the flame may be hotter than the outer portions of the flame. Accordingly, the exhaust gas temperatures vary from sensor to sensor, such that temperature sensor $124_{t5}$ measures a different temperature than temperature sensor $124_{t6}$.

Figure 5:
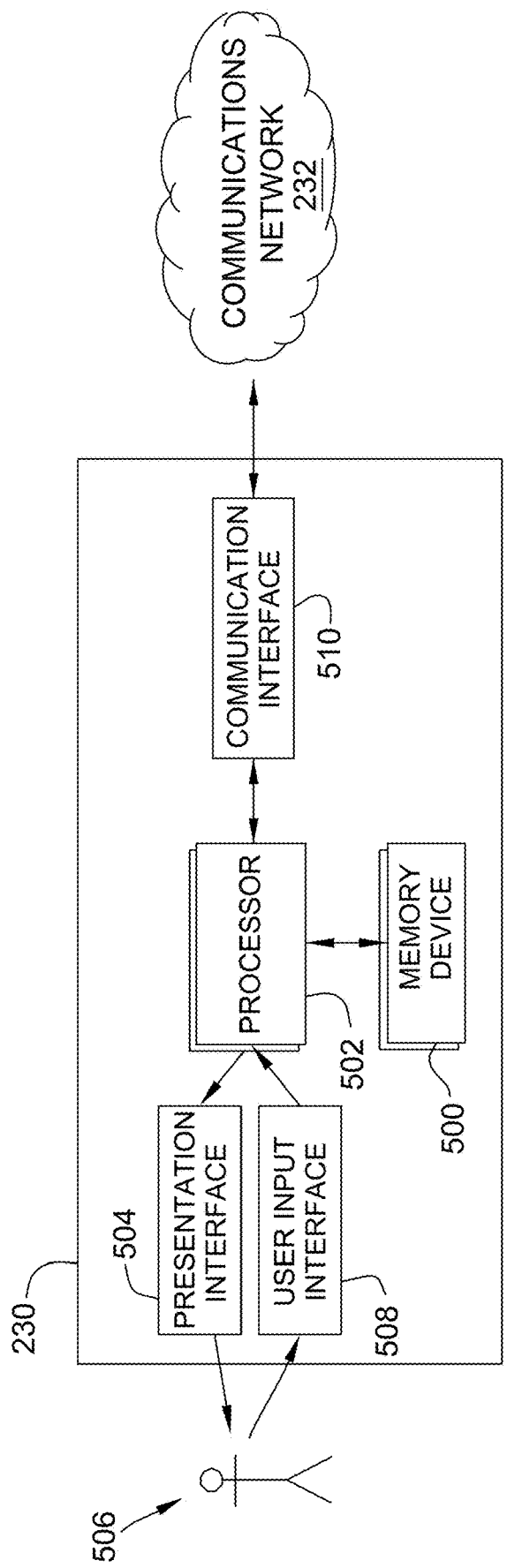
FIG. 5 is a block diagram of a remote monitoring system for use with the gas turbine engine of FIG. 2.

With reference to FIGS. 1 and 3, in the exemplary embodiment, on-site monitoring system 118 stores the temperature measurement data from temperature sensors $124t_1$-$124t_{27}$, obtained from gas turbine engine 100, in a memory device 500 (shown in FIG. 5). Those skilled in the art will recognize that on-site monitoring system 118 can store additional information (e.g., rules for fixing anomalies, corrective actions, etc.) in memory device 500. In the exemplary embodiment, while the temperature measurement data is placed in memory device 500, an algorithm is executed that analyzes the temperature measurement data to determine if any temperature sensors $124t_1$-$124t_{27}$ are connected or jumpered to any other temperature sensors $124t_1$-$124t_{27}$, indicating potential override of on-site monitoring system 118.

The algorithm executed by on-site monitoring system 118 facilitates continued monitoring and processing of the temperature measurements of temperature sensors $124t_1$-$124t_{27}$ transmitted to controller 108. The algorithm enables on-site monitoring system 118 to perform real-time monitoring of the temperature sensors $124t_1$-$124t_{27}$. The algorithm detects and escalates an alarm (or reduces power or shutdowns the turbine engine) when a temperature sensor $124t_1$-$124t_{27}$ is believed to be connected or jumpered to another temperature sensor $124t_1$-$124t_{27}$. Jumpering of temperature sensors $124t_1$-$124t_{27}$ can occur when the gas turbine engine 100 operator couples a signal line from a functioning temperature sensors $124t_1$-$124t_{27}$ to a signal line of a failed or nonfunctioning temperature sensors $124t_1$-$124t_{27}$. For example, and without limitation, when jumpering of temperature sensors $124t_1$-$124t_{27}$ occurs, the temperature data measurements from the jumpered sensors are substantially the same.

With reference to FIGS. 2 and 3, the alternative embodiment of gas turbine engine 200 facilitates remotely detecting when a temperature sensor $124t_1$-$124t_{27}$ is believed to be connected or jumpered to another temperature sensors $124t_1$-$124t_{27}$ in each gas turbine engine 200 of a fleet of gas turbine engines 200. For example, in the exemplary embodiment, remote monitoring system 230 receives temperature measurement data measured by temperature sensors $124t_1$-$124t_{27}$ from controller 108, or in some embodiments, on-site monitoring system 118, via communications network 232, for determination of whether a temperature sensor $124t_1$-$124t_{27}$ is believed to be connected or jumpered to another temperature sensor $124t_1$-$124t_{27}$. Remote monitoring system 230 stores, in a database 234, the temperature measurement data from temperature sensors $124t_1$-$124t_{27}$, obtained from gas turbine engine 200, as well as any other gas turbine engine located at the site of gas turbine engine 200, and temperature data of other gas turbine engines operating at other locations. Those skilled in the art will recognize that remote monitoring system 230 can have other databases that store additional information (e.g., rules for fixing anomalies, corrective actions, etc.), or that it is possible to store this additional information and the temperature measurement data in database 234 all in one database. In the exemplary embodiment, while the temperature measurement data is placed in database 234, an algorithm is executed that analyzes the temperature measurement data to determine if any temperature sensors $124t_1$-$124t_{27}$ are connected or jumpered to any other temperature sensors $124t_1$-$124t_{27}$ in a respective gas turbine engine 200, indicating potential override of remote monitoring system 230 and/or on-site monitoring system 118.

The algorithm executed by remote monitoring system 230 is substantially the same as the algorithm described herein with respect to on-site monitoring system 118. As such, the algorithm executed by remote monitoring system 230 facilitates continued monitoring and processing of the temperature measurements of temperature sensors $124t_1$-$124t_{27}$ transmitted to remote monitoring system 230 from each respective gas turbine engine 200. The algorithm enables remote monitoring system 230 to perform real-time monitoring of the temperature sensors $124t_1$-$124t_{27}$. The algorithm detects and escalates an alarm (or reduces power or shutdowns the turbine engine) when a temperature sensor $124t_1$-$124t_{27}$ is believed to be connected or jumpered to another temperature sensor $124t_1$-$124t_{27}$ of a respective gas turbine engine 200. Jumpering of temperature sensors $124t_1$-$124t_{27}$ can occur when the gas turbine engine 200 operator couples a signal line from a functioning temperature sensors $124t_1$-$124t_{27}$ to a signal line of a failed or nonfunctioning temperature sensors $124t_1$-$124t_{27}$. For example, and without limitation, when jumpering of temperature sensors $124t_1$-$124t_{27}$ occurs, the temperature data measurements from the jumpered sensors are substantially the same.

Figure 4:
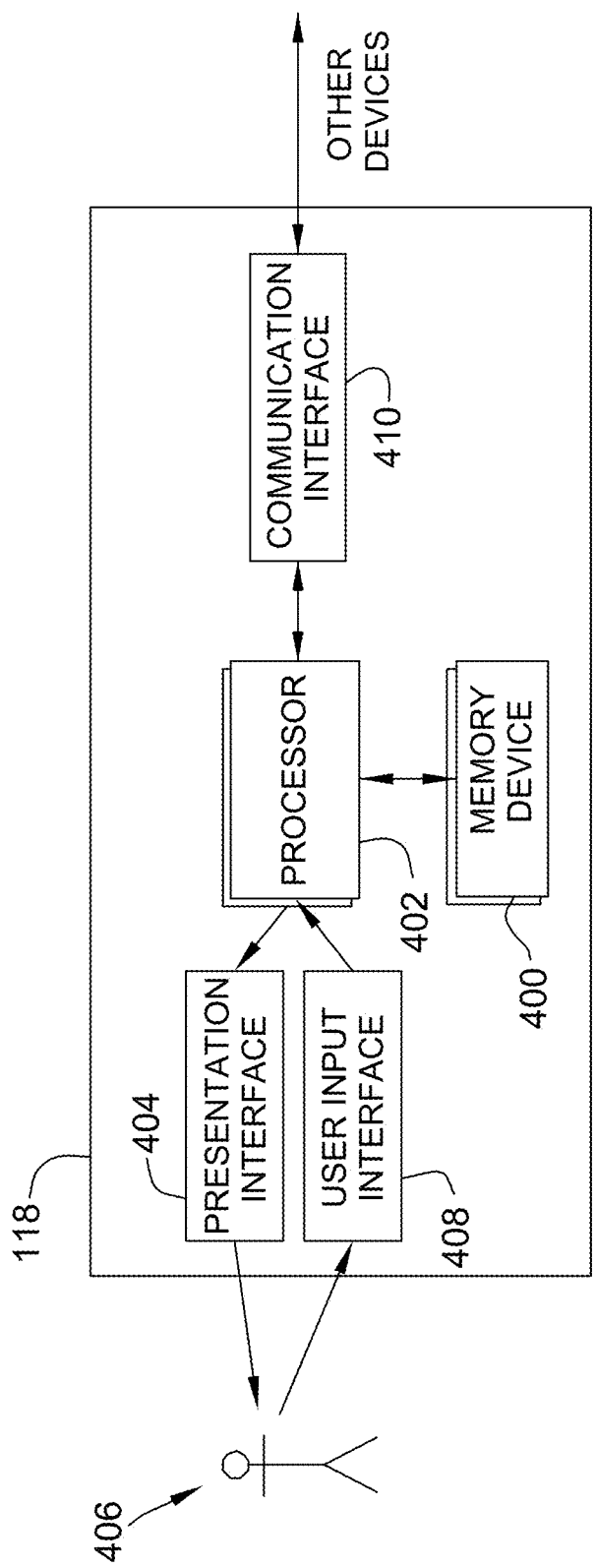
FIG. 4 is a block diagram of an on-site monitoring system for use with the gas turbine engine of FIG. 1.

FIG. 4 is a block diagram of on-site monitoring system 118 that may be used to perform monitoring of any piece of equipment, system, and process, for example, and without limitation, monitoring and processing of operating parameters of gas turbine engine 100 (shown in FIG. 1). In the exemplary embodiment, on-site monitoring system 118 includes a memory device 400 and a processor 402 that is coupled to memory device 400. Processor 402 may include one or more processing units, such as, without limitation, a multi-core configuration. In some embodiments, executable instructions are stored in memory device 400. On-site monitoring system 118 is configurable to perform one or more operations described herein by programming processor 402. Processor 402 may be programmed by encoding an operation as one or more executable instructions and providing the executable instructions in memory device 400. For example, in the exemplary embodiment, processor 402 is programmed to analyze the signals received from temperature sensors $124t_1$-$124t_{27}$ in order to verify the accuracy of the detected exhaust gas temperature measurements. More specifically, in one embodiment, processor 402 is programmed to analyze the signals by performing a difference calculation or determination on at least one pair of signals, wherein each signal within the pair of signals is indicative of being received from a different temperature sensor $124t_1$-$124t_{27}$. Processor 402 may also be programmed to determine a continuous mean and standard deviation on the result of the difference determination. Processor 402 is also programmed to determine whether the mean and standard deviation between the two current values associated with the pair of signals is substantially low and/or is below a predefined threshold. Processor 402 generates at least one output, such as an escalation alarm and/or a textual or graphical output of the signals, such that the output can be presented to a user via presentation interface 404 for failure analysis. Moreover, controller 108 may be configured to reduce the operating load of gas turbine engine 100 and/or initiate a complete shutdown of gas turbine engine 100 in response to the escalation alarm generated by processor 402.

In the exemplary embodiment, memory device 400 is one or more devices that enable storage and retrieval of information such as executable instructions or other data. Memory device 400 may include one or more computer readable media, for example, and without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 400 may be configured to store operating parameters including, without limitation, real-time and historical operating parameter values, or any other type of data. In some embodiments, processor 402 removes or "purges" data from memory device 400 based on the age of the data. For example, processor 402 may overwrite previously recorded and stored data associated with a subsequent time or event. In addition, or alternatively, processor 402 may remove data that exceeds a predetermined time interval. In addition, memory device 400 includes, without limitation, sufficient data, algorithms, and commands to facilitate monitoring and processing sensor measurements received from sensors coupled to a gas turbine engine including, without limitation, the plurality of temperature sensors 124.

In some embodiments, on-site monitoring system 118 includes a presentation interface 404 coupled to processor 402. Presentation interface 404 presents information, such as a user interface, to a user 406. In one embodiment, presentation interface 404 includes a display adapter (not shown) that is coupled to a display device (not shown), such as a cathode ray tube (CRT), a liquid crystal display (LCD), an organic LED (OLED) display, or an "electronic ink" display. In some embodiments, presentation interface 404 includes one or more display devices. In addition, or alternatively, presentation interface 404 includes an audio output device (not shown), for example, without limitation, an audio adapter, a speaker, or a printer (not shown).

In some embodiments, on-site monitoring system 118 includes a user input interface 408. In the exemplary embodiment, user input interface 408 is coupled to processor 402 and receives input from user 406. User input interface 408 may include, for example, and without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 404 and user input interface 408.

In the exemplary embodiment, a communication interface 410 is coupled to processor 402 and is configured to be coupled in communication with one or more other devices, such as controller 106 and/or temperature sensors $124t_1$-$124t_{27}$, and to perform input and output operations with respect to such devices while performing as an input channel. For example, communication interface 410 may include, without limitation, a wired network adapter, a wireless network adapter, a mobile telecommunications adapter, a serial communication adapter, or a parallel communication adapter. Communication interface 410 may receive a data signal from or transmit a data signal to one or more remote devices, such as temperature sensors $124t_1$-$124t_{27}$. For example, in an alternative embodiment, communication interface 410 of on-site monitoring system 118 may transmit/receive a data signal to/from remote monitoring system 230.

Presentation interface 404 and communication interface 410 are both capable of providing information suitable for use with the methods described herein, such as, providing information to user 406 or processor 402. Accordingly, presentation interface 404 and communication interface 410 may be referred to as output devices. Similarly, user input interface 408 and communication interface 410 are capable of receiving information suitable for use with the methods described herein and may be referred to as input devices.

FIG. 5 is a block diagram of remote monitoring system 230 that may be used to perform monitoring of any piece of equipment, system, and process, such as, without limitation, monitoring and processing of operating parameters of gas turbine engine 200 (shown in FIG. 2). In the exemplary embodiment, remote monitoring system 230 includes a memory device 500 and a processor 502 that is coupled to memory device 500. Processor 502 may include one or more processing units, such as, without limitation, a multi-core configuration. In some embodiments, executable instructions are stored in memory device 500. Remote monitoring system 230 is configurable to perform one or more operations described herein by programming processor 502. For example, processor 502 may be programmed by encoding an operation as one or more executable instructions and providing the executable instructions in memory device 500. For example, processor 502 is programmed to analyze the signals received from controller 108 in order to verify the accuracy of the detected temperature measurements from temperature sensors $124t_1$-$124t_{27}$. More specifically, in one embodiment, processor 502 is programmed to analyze the signals by performing a difference calculation or determination on at least one pair of signals, wherein each signal within the pair of signals is indicative of being received from a different temperature sensor $124t_1$-$124t_{27}$. Processor 502 may also be programmed to determine a continuous mean and standard deviation on the result of the difference determination. Processor 502 is also programmed to determine whether the mean and standard deviation between the two current values associated with the pair of signals is substantially low and/or is below a predefined threshold. Processor 502 generates at least one output, such as an escalation alarm and/or a textual or graphical output of the signals, such that the output can be transmitted to a user via communications network 232 for failure analysis. Moreover, I some embodiments, controller 108 may be configured to receive the escalation alarm and reduce the operating load of gas turbine engine 200 and/or initiate a complete shutdown of gas turbine engine 200 in response to the escalation alarm generated by processor 502.

In the exemplary embodiment, memory device 500 is one or more devices that enable storage and retrieval of information such as executable instructions or other data. Memory device 500 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

In some embodiments, processor 502 removes or "purges" data from memory device 500 based on the age of the data. For example, processor 502 may overwrite previously recorded and stored data associated with a subsequent time or event. In addition, or alternatively, processor 502 may remove data that exceeds a predetermined time interval. In addition, memory device 500 includes, without limitation, sufficient data, algorithms, and commands to facilitate monitoring and processing sensor measurements received from sensors coupled to gas turbine engine 200 including, without limitation, temperature sensors $124t_1$-$124t_{27}$.

In some embodiments, remote monitoring system 230 includes a presentation interface 504 coupled to processor 502. Presentation interface 504 presents information, such as a user interface, to a user 506. In one embodiment, presentation interface 504 includes a display adapter (not shown) that is coupled to a display device (not shown), such as a cathode ray tube (CRT), a liquid crystal display (LCD), an organic LED (OLED) display, or an "electronic ink" display. In some embodiments, presentation interface 504 includes one or more display devices. In addition, or alternatively, presentation interface 504 includes an audio output device (not shown), for example, without limitation, an audio adapter, a speaker, or a printer (not shown).

In some embodiments, remote monitoring system 230 includes a user input interface 508. In the exemplary embodiment, user input interface 508 is coupled to processor 502 and receives input from user 506. User input interface 508 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 504 and user input interface 508.

In the exemplary embodiment, a communication interface 510 is coupled to processor 502 and is configured to be coupled in communication with communications network 232 and/or one or more other devices, such as database 234, and to perform input and output operations with respect to communications network 232 while performing as an input channel. For example, communication interface 510 may include, without limitation, a wired network adapter, a wireless network adapter, a mobile telecommunications adapter, a serial communication adapter, or a parallel communication adapter. Communication interface 510 may receive a data signal from or transmit a data signal to one or more remote devices via communications network 232. For example, in an alternative embodiment, communication interface 510 of remote monitoring system 230 may transmit/receive a data signal to/from controller 108 or on-site monitoring system 118 of gas turbine engine 200.

Presentation interface 504 and communication interface 510 are both capable of providing information suitable for use with the methods described herein, such as, providing information to user 506 or processor 502. Accordingly, presentation interface 504 and communication interface 510 may be referred to as output devices. Similarly, user input interface 508 and communication interface 510 are capable of receiving information suitable for use with the methods described herein and may be referred to as input devices.

Figure 6:
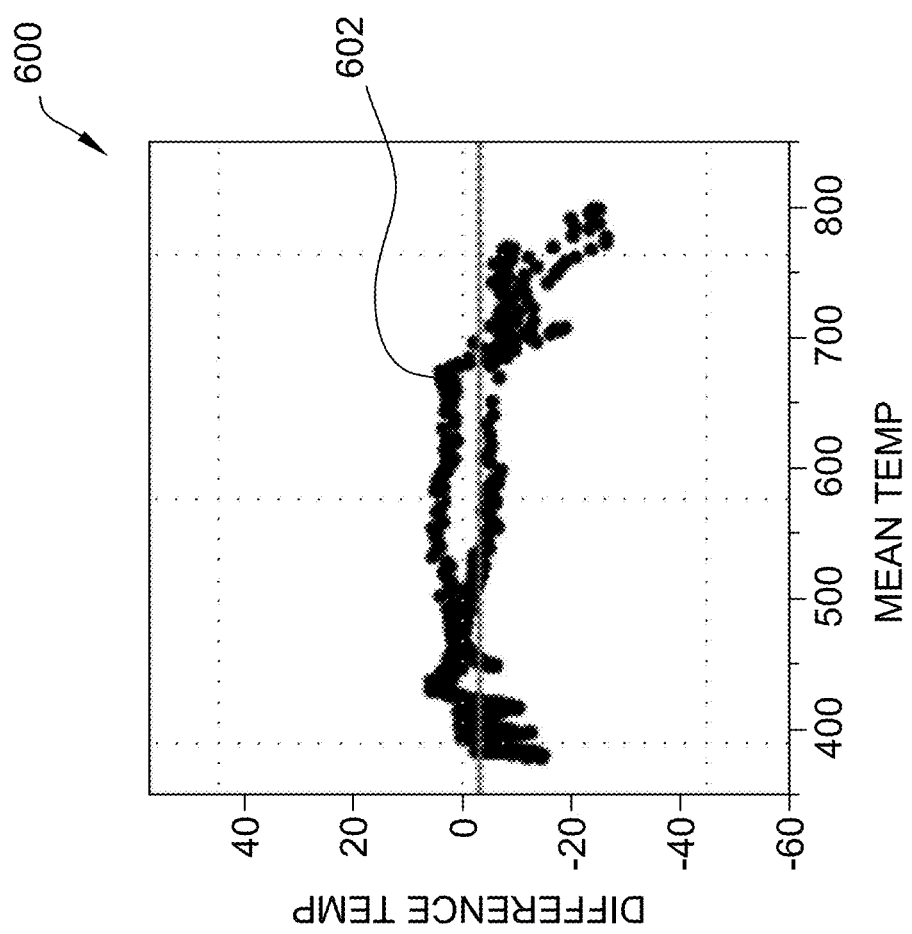
FIG. 6 is a data plot of a non-jumpered pair of temperature sensors of the gas turbine engine of FIG. 1 during a transient event.
Figure 7:
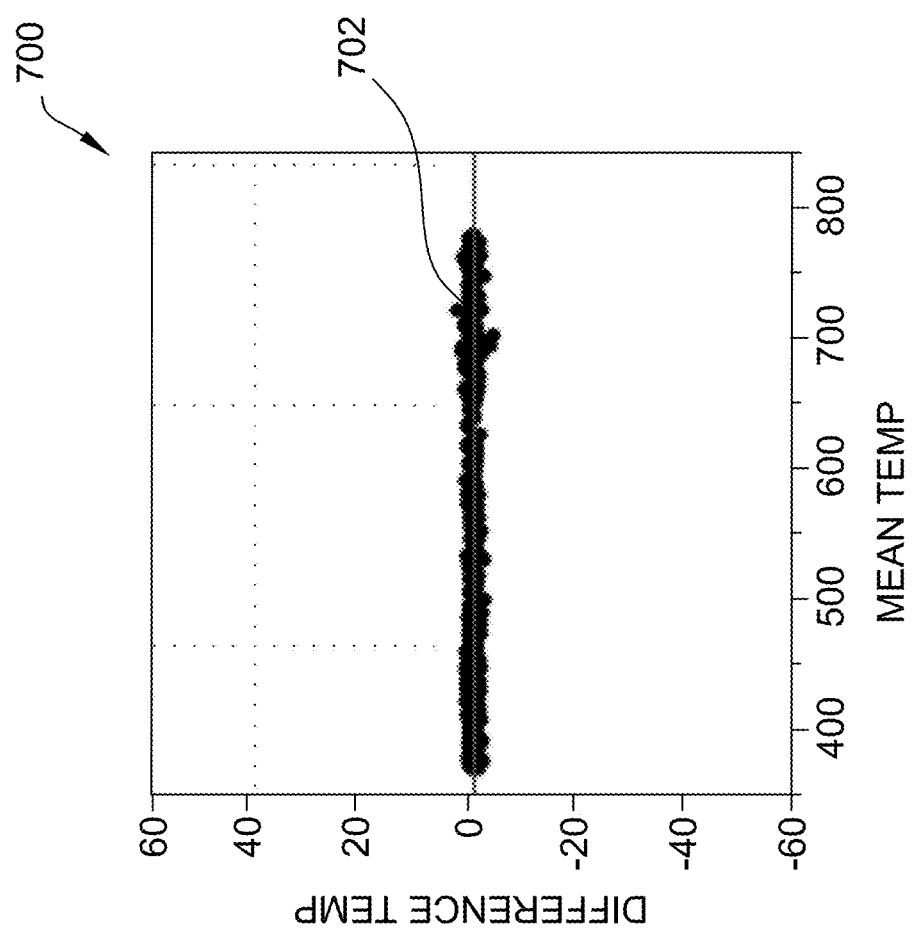
FIG. 7 is a data plot of a jumpered pair of temperature sensors of the gas turbine engine of FIG. 1 during a transient event.

FIG. 6 is a data plot 600 of a non-jumpered pair of temperature sensors $124t_1$-$124t_{27}$ of gas turbine engine 100 (shown in FIG. 1) during a transient event, such as shutdown of gas turbine engine 100. In the exemplary embodiment, the difference between the received temperature sensors temperature data versus the temperature sensors average temperature during a transient event shows a non-linear relationship, as indicated by data 602. The mean differential between the temperature measurements received at the two temperature sensor inputs to controller 108, as well as a standard deviation of the temperature measurements, is higher for non-jumpered temperature sensors $124t_1$-$124t_{27}$. For example, FIG. 7 is a data plot 700 of a jumpered pair of temperature sensors $124t_1$-$124t_{27}$ of gas turbine engine 100 (shown in FIG. 1) during a transient event, such as shutdown of gas turbine engine 100. In this embodiment, the difference between the received temperature sensors temperature data versus the temperature sensors average temperature during the transient event shows a linear relationship substantially centered about zero, as indicated by data 702. The mean differential between the temperature measurements of the two temperature sensor inputs, as well as a standard deviation of the temperature measurements, is small as compared to the non-jumpered pair of temperature sensors $124t_1$-$124t_{27}$, approaching zero. Noise in the signals received by controller 108 facilitates the small difference in the data, as ideally, the data would be identical for each of the temperature sensors $124t_1$-$124t_{27}$, because one temperature sensor is providing the data for both temperature sensor inputs at controller 108. It is noted that the difference value is centered about zero in a jumpered pair of temperature sensors $124t_1$-$124t_{27}$. A difference value centered about any other temperature value may be indicative of an offset between two functioning temperature sensors $124t_1$-$124t_{27}$.

With reference to FIG. 1, during operation, gas turbine engine 100 generates mechanical rotational energy that is converted to electrical energy via generator 116. On-site monitoring system 118 detects the exhaust gas temperature values being generated by temperature sensor $124t_1$-$124t_2$. More specifically, in the exemplary embodiment, exhaust gasses are channeled from combustors $C_1$-$C_{14}$ to turbine 106. Temperature sensors $124t_1$-$124t_{27}$ detect the exhaust gas temperature values that are channeled proximate each respective temperature sensor $124t_1$-$124t_{27}$. Each temperature sensor $124t_1$-$124t_{27}$ generates a signal representative of the detected exhaust gas temperature value, and each temperature sensor $124t_1$-$124t_{27}$ transmits the generated signal to controller 108.

Figure 8:
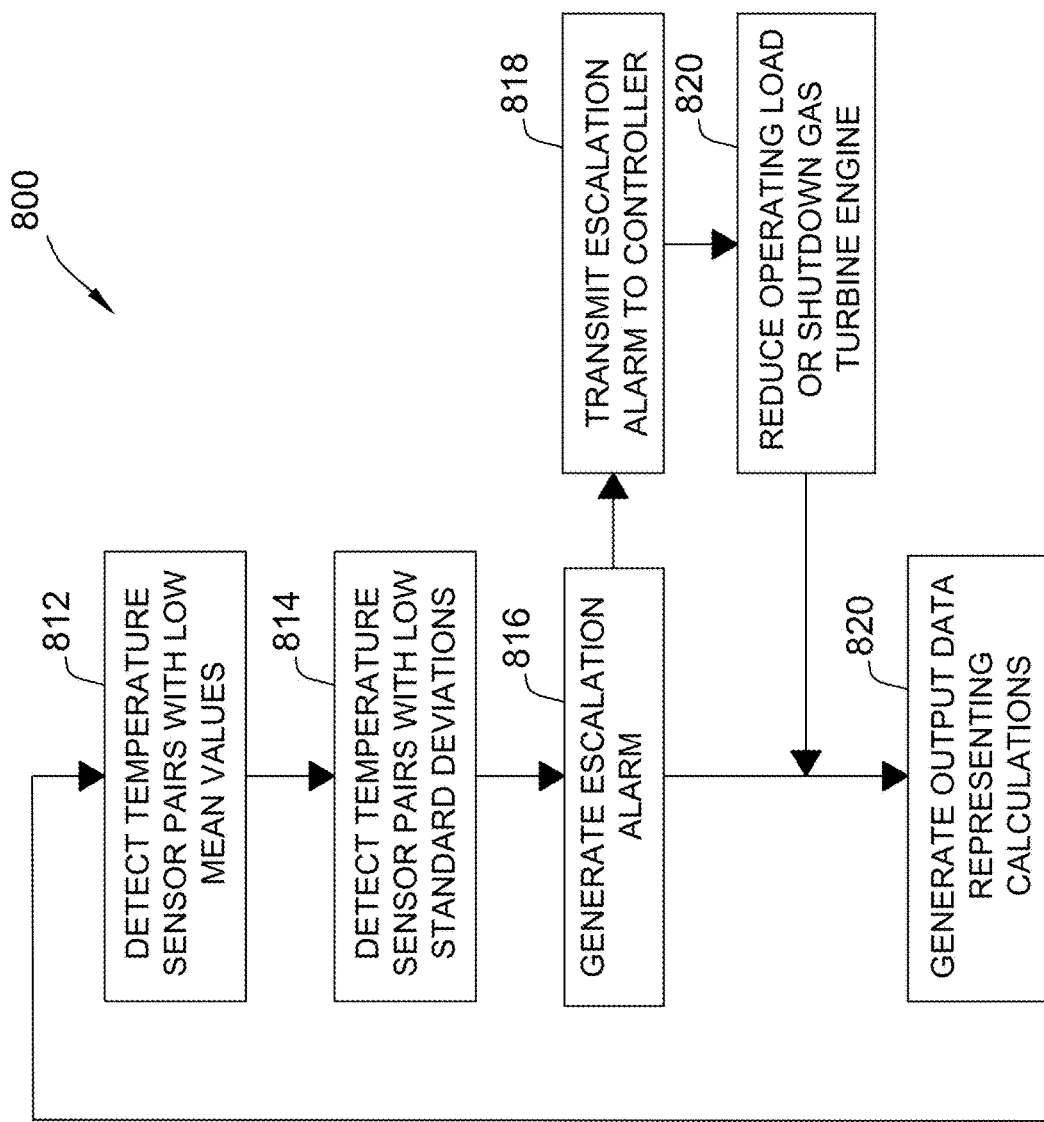
FIG. 8 is a flow diagram of a method for use by the on-site monitoring system of FIG. 1 to detect a jumpered temperature sensor of FIG. 3.

FIG. 8 is a flow diagram of a method 800 describing the process operations used by on-site monitoring system 118 (shown in FIG. 1) to detect a jumpered temperature sensor $124t_1$-$124t_{27}$ (shown in FIG. 3). In exemplary method 800, controller 108 transmits 802 the temperature signals to on-site monitoring system 118, which analyzes the signals to verify the accuracy of the detected temperature values. In the exemplary embodiment, processor 402 performs a difference determination on at least one pair of signals received from temperature sensors $124t_1$-$124t_{27}$. More specifically, in one embodiment, processor 402 may receive one signal representative of a detected temperature value from each temperature sensor $124t_1$-$124t_{27}$. Processor 402 designates 804 the signals into unique pairs, such as $124t_1$-$124t_2$, wherein every temperature sensor pair combination is analyzed. Processor 402 determines 806 temperature difference values with respect to time for each of the temperature sensor pairs of signals. In addition, processor 402 continuously determines 808 a mean value on the results of the difference determination between each temperature sensor pair. Processor 402 continuously determines 810 a standard deviation on the results of the mean determination between each temperature sensor pair. The temperature sensor pairs with substantially low mean values, i.e., mean values approaching zero, and/or below a predefined threshold, are identified 812. Moreover, of the identified temperature sensor pairs with substantially low mean values, those temperature sensor pairs with substantially low standard deviation value, i.e., standard deviation values approaching zero, and/or below a predefined threshold, are identified 814 and are indicative of a jumpered temperature sensor pair, i.e., a temperature sensor pair including a temperature sensor jumpered to the other temperature sensor of the pair.

Temperature signal pairs with mean and standard deviations approaching zero, and/or below a predefined threshold, are presumed to include a failed or a defective temperature sensor $124t_1$-$124t_{27}$. In one embodiment, processor 402 generates 816 at least one output for presentation to user 406 via presentation interface 404 based on the identification of a jumpered temperature sensor pair. For example, and without limitation, the output includes an audible, a textual, and/or a graphical escalation alarm, such that user 406 can perform a failure analysis on the associated temperature signals pairs to identify and repair the faulty temperature sensor $124t_1$-$124t_{27}$. In other embodiments, processor 402 transmits 818 an escalation alarm signal to controller 108. In such embodiments, controller 108 is configured to reduce 820 the operating load of gas turbine engine 100 and/or shutdown gas turbine engine 100 in response to the escalation alarm signal generated by processor 402.

In addition, in the exemplary embodiment, processor 402 generates 822 output data indicative of the results of the above-referenced determinations, such that the output data is presented to user 406 via presentation interface 404. For example, a graphical output of the difference determinations may be presented to user 406 and/or the differential temperature values with the mean temperature values for the temperature sensor pair, as shown in FIGS. 6 and 7. User 406 can use such information to schedule and/or initiate repairs.

In an alternative embodiment, controller 108 of a respective gas turbine engine 200 of a fleet of gas turbine engines transmits the temperature signals to remote monitoring system 230 via communications network 232. Remote monitoring system 230 then analyzes the temperature signals substantially the same as on-site monitoring system 118, described above with respect to method 800.

The foregoing methods describe some of the processing operations associated with detecting jumpered temperature sensors in gas turbine engines 100 and 200. In this regard, each block shown in FIG. 8 represents a process act associated with performing these operations. It should be noted that in some alternative embodiments, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing operations may be added.

In the various embodiments of the present disclosure, portions of the processing operations performed by on-site monitoring system 118 and/or remote monitoring system 230 can be implemented in the form of an entirely hardware embodiment, an entirely software embodiment, or an embodiment containing both hardware and software elements. In one embodiment, the processing functions performed by on-site monitoring system 118 and/or remote monitoring system 230 may be implemented in software, which includes but is not limited to firmware, resident software, microcode, etc.

Furthermore, the processing functions performed by on-site monitoring system 118 and/or remote monitoring system 230 can take the form of a computer program product accessible from a tangible, non-transitory, computer readable medium providing program code for use by or in connection with a computer or any instruction execution system (e.g., processing units). For the purposes of this disclosure, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The systems and methods described herein facilitate detecting jumpered temperature sensors in one or more gas turbine engines, either remotely or on-site. Specifically, an on-site monitoring system and/or a remote monitoring system is configured to receive temperature measurement values from a plurality of exhaust gas temperature sensors and analyze the data to determine whether a temperature sensor is jumpered with another temperature sensor. The on-site monitoring system and/or remote monitoring system is configured to use the gas turbine engine's existing sensors to acquire the necessary temperature data required to determine whether a temperature sensor is jumpered with another temperature sensor. Therefore, in contrast to known gas turbine engines, the systems and methods described herein facilitate enabling the monitoring of one or more gas turbine engines to be implemented with reduced cost, and enabling rapid changes to the detection algorithm if necessary to increase accuracy.

An exemplary technical effect of the methods and systems described herein includes at least one of: (a) locally and/or remotely receiving the exhaust gas temperatures a gas turbine engine; (b) determining whether a temperature sensor is jumpered with another temperature sensor in the gas turbine engine; (c) escalation alarming an operator of the gas turbine engine that a temperature sensor is jumpered with another temperature sensor based on the operating parameters received; (d) reducing the operating load and/or shutting down the gas turbine engine in response to the escalation alarm.

The methods and systems described herein are not limited to the specific embodiments described herein. For example, components of each system and/or steps of each method may be utilized independently and separately from other components and/or steps described herein. For example, the method and systems may also be used in combination with other turbine systems, and are not limited to practice only with the gas turbine engines as described herein. Rather, the exemplary embodiment can be implemented and utilized in connection with many other turbine applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the systems and methods described herein, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for remote detection of control sensor override in a fleet of gas turbine engines, said system comprising:
    an on-site monitoring system coupled to each gas turbine engine of the fleet of gas turbine engines, said on-site monitoring system configured to continuously receive a plurality of signals representative of exhaust gas temperatures, said on-site monitoring system further configured to transmit the plurality of signals to a remote monitoring system;
    a respective plurality of temperature sensors coupled to each gas turbine engine of the fleet of gas turbine engines and configured to transmit the plurality of signals to said on-site monitoring system, the plurality of signals comprising at least a first set of signals and a second set of signals, said respective plurality of temperature sensors comprising at least a first temperature sensor and a second temperature sensor, said first temperature sensor at a first location to measure a first temperature and to emit the first set of signals, said second temperature sensor at a second location to measure a second temperature and to emit the second set of signals; and
    said remote monitoring system remote from each gas turbine engine in the fleet of gas turbine engines, said remote monitoring system configured to receive the plurality of signals from said on-site monitoring system and to detect when two of the signals in the first set of signals represent both the first temperature and the second temperature.

2. A system in accordance with claim 1, wherein said remote monitoring system is further configured to designate the plurality of signals into unique signal pairs associated with each gas turbine engine in the fleet of gas turbine engines, respectively.

3. A system in accordance with claim 2, wherein said remote monitoring system is further configured to:
    determine exhaust gas temperature difference values with respect to time for each of the designated signal pairs; and
    determine a mean value and a standard deviation value of the temperature difference values for each designated signal pair.

4. A system in accordance with claim 3, wherein detecting when the two of the signals in the first set of signals represent both the first temperature and the second temperature comprises:
    comparing the mean value and the standard deviation value of each designated signal pair to a predefined threshold value; and
    identifying one of the designated signal pairs corresponding to the two signals in the first set of signals representing both the first temperature and the second temperature based on the comparison.

5. A system in accordance with claim 1, wherein said remote monitoring system is further configured to generate an escalation alarm indicating the detection of the two of the first set of signals of the plurality of signals representing both the first temperature and the second temperature.

6. A system in accordance with claim 5, wherein said remote monitoring system is further configured to transmit the escalation alarm to a controller of one gas turbine engine of the fleet of gas turbine engines associated with the two signals in the first set of signals representing both the first temperature and the second temperature, said controller configured to present to a user the escalation alarm in response to receiving the escalation alarm.

\* \* \* \* \*